United States Patent
Lee

(10) Patent No.: US 7,426,625 B2
(45) Date of Patent: Sep. 16, 2008

(54) DATA PROCESSING SYSTEM AND COMPUTER PROGRAM PRODUCT FOR SUPPORT OF SYSTEM MEMORY ADDRESSES WITH HOLES

(75) Inventor: Van Hoa Lee, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 473 days.

(21) Appl. No.: 10/814,733

(22) Filed: Mar. 31, 2004

(65) Prior Publication Data

US 2005/0223185 A1  Oct. 6, 2005

(51) Int. Cl.
*G06F 9/26* (2006.01)
*G06F 9/34* (2006.01)
*G06F 12/00* (2006.01)

(52) U.S. Cl. ............ 711/203; 711/6; 711/202; 711/204; 711/205; 711/206; 711/207; 711/208; 711/209; 711/210; 711/170; 711/171; 711/172; 711/173

(58) Field of Classification Search ........... 711/6, 711/202–210, 170–173
See application file for complete search history.

(56) References Cited

U.S. PATENT DOCUMENTS

| | | | | |
|---|---|---|---|---|
| 4,991,082 A * | 2/1991 | Yoshizawa et al. | ........... | 711/209 |
| 5,297,270 A * | 3/1994 | Olson | .............. | 711/3 |
| 5,548,746 A * | 8/1996 | Carpenter et al. | ........... | 710/3 |
| 5,581,768 A * | 12/1996 | Garney et al. | ............... | 718/104 |
| 5,706,464 A * | 1/1998 | Moore et al. | ............... | 711/122 |
| 5,819,298 A * | 10/1998 | Wong et al. | ............... | 707/205 |
| 6,061,773 A * | 5/2000 | Harvey et al. | ............... | 711/206 |
| 6,256,710 B1 * | 7/2001 | Yazdy et al. | ............... | 711/133 |
| 6,564,299 B1 * | 5/2003 | Auracher | .................... | 711/138 |
| 6,629,111 B1 * | 9/2003 | Stine et al. | .................. | 707/205 |
| 6,877,158 B1 * | 4/2005 | Arndt | ........................ | 718/104 |
| 2003/0177332 A1 * | 9/2003 | Shiota | ........................ | 711/203 |
| 2003/0188062 A1 * | 10/2003 | Luse et al. | ................. | 710/104 |

FOREIGN PATENT DOCUMENTS

| | | |
|---|---|---|
| JP | 64019446 | 1/1989 |
| JP | 02108691 | 4/1990 |
| JP | 2189655 | 7/1990 |
| JP | 03288267 | 12/1991 |
| JP | 08101802 | 4/1994 |
| JP | 06250919 | 9/1994 |
| JP | 08101792 | 4/1996 |
| JP | 2000347929 | 12/2000 |
| JP | 2002632806 | 10/2002 |

* cited by examiner

*Primary Examiner*—Sanjiv Shah
*Assistant Examiner*—Yaima Campos
(74) *Attorney, Agent, or Firm*—Duke W. Yee; Diana K. Gerhardt; Lisa L. B. Yociss

(57) ABSTRACT

A method, computer program product, and a data processing system for supporting memory addresses with holes is provided. A first physical address range allocated for system memory for an operating system run by a processor configured to support logical partitioning is virtualized to produce a first logical address range. A second physical address range allocated for system memory for the operating system is virtualized to produce a second logical address range. The first physical address range and the second physical address range are non-contiguous. Virtualization of the first and second physical address ranges is had such that the first logical address range and the second logical address range are contiguous. A memory mapped input/output physical address range that is intermediate the first physical address range and the second physical address range is virtualized to produce a third logical address range. A lowermost logical address of the third logical address range exceeds a respective upper most logical address of the first and second logical address ranges.

15 Claims, 3 Drawing Sheets

DATA PROCESSING SYSTEM AND COMPUTER PROGRAM PRODUCT FOR SUPPORT OF SYSTEM MEMORY ADDRESSES WITH HOLES

BACKGROUND OF THE INVENTION

1. Technical Field

The present invention relates generally to an improved data processing system and in particular to a method and data processing system for improved operating system operation. Still more particularly, the present invention provides a method and data processing system for providing virtualization of memory-mapped input/output physical addresses to provide a contiguous system memory address space.

2. Description of Related Art

In many data processing systems, input/output cache inhibited addresses are mapped into an address range of the system address space. Often, the input/output cache inhibited addresses have physical addresses intermediate multiple physical address ranges of the system memory allocated for operating system usage. In such an instance, the input/output cache inhibited addresses present a memory "hole" of physical addresses that reside in between separate blocks of memory addressable by the operating system.

An operating system may fail to support system memory addresses with holes. For example, in some configurations of two memory arrays, the Linux operating system may fail to handle memory addresses with holes. In such a situation, the operating system kernel may be modified to accommodate the memory hole. However, such a solution is time consuming and may jeopardize some server program functionality, availability, and the ability of the data processing system to fully support an operating system version with such deficiencies.

Accordingly, it would be advantageous to provide a data processing system that supports system memory addresses with holes. It would be further advantageous to provide a data processing system that supports system memory addresses with holes without requiring modification of the operating system kernel.

SUMMARY OF THE INVENTION

The present invention provides a method, computer program product, and a data processing system for supporting memory addresses with holes. A first physical address range allocated for system memory for an operating system run by a processor configured to support logical partitioning is virtualized to produce a first logical address range. A second physical address range allocated for system memory for the operating system is virtualized to produce a second logical address range. The first physical address range and the second physical address range are non-contiguous. Virtualization of the first and second physical address ranges is had such that the first logical address range and the second logical address range are contiguous. A memory mapped input/output physical address range that is intermediate the first physical address range and the second physical address range is virtualized to produce a third logical cache inhibited address range. A lowermost logical address of the third logical address range exceeds a respective upper most logical address of the first and second logical address ranges.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
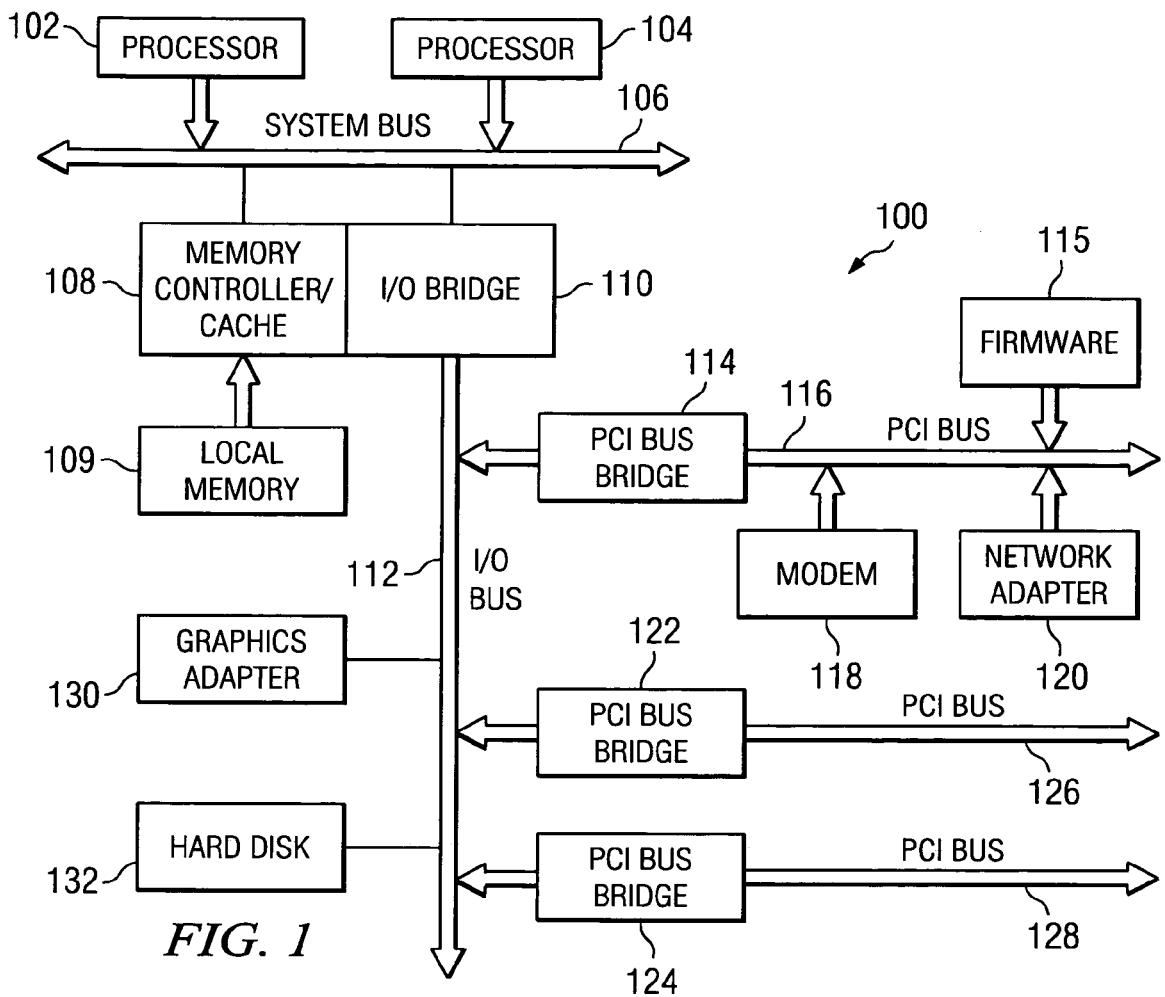
FIG. 1 is a block diagram of a data processing system that provides for support of system memory addresses with holes depicted in accordance with a preferred embodiment of the present invention.

Referring to FIG. 1, a block diagram of a data processing system that provides for support of system memory addresses with holes is depicted in accordance with a preferred embodiment of the present invention. Data processing system 100 may be a symmetric multiprocessor (SMP) system including a plurality of processors 102 and 104 connected to system bus 106. Preferably, processors 102 and 104 are adapted to run under a logical partitioning environment. For example, processors 102 and 104 may be implemented as respective 970 PowerPC processors manufactured by International Business Machines Corporation of Armonk, N.Y., or a similarly functional processor device. Alternatively, a single processor system may be employed. Also connected to system bus 106 is memory controller/cache 108, which provides an interface to local memory 109. I/O bus bridge 110 is connected to system bus 106 and provides an interface to I/O bus 112. Memory controller/cache 108 and I/O bus bridge 110 may be integrated as depicted.

Peripheral component interconnect (PCI) bus bridge 114 connected to I/O bus 112 provides an interface to PCI local bus 116. A number of modems may be connected to PCI local bus 116. Typical PCI bus implementations will support four PCI expansion slots or add-in connectors. Communications links to clients data processing systems may be provided through modem 118 and network adapter 120 connected to PCI local bus 116 through add-in connectors. Additionally, a system firmware 115 may be connected to local bus 116.

Additional PCI bus bridges 122 and 124 provide interfaces for additional PCI local buses 126 and 128, from which additional modems or network adapters may be supported. In this manner, data processing system 100 allows connections to multiple network computers. A memory-mapped graphics adapter 130 and hard disk 132 may also be connected to I/O bus 112 as depicted, either directly or indirectly.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 1 may be, for example, an IBM JS20 blade eServer pSeries system, a product of International Business Machines Corporation in Armonk, N.Y., running the Advanced Interactive Executive (AIX) operating system or LINUX operating system.

Figure 2:
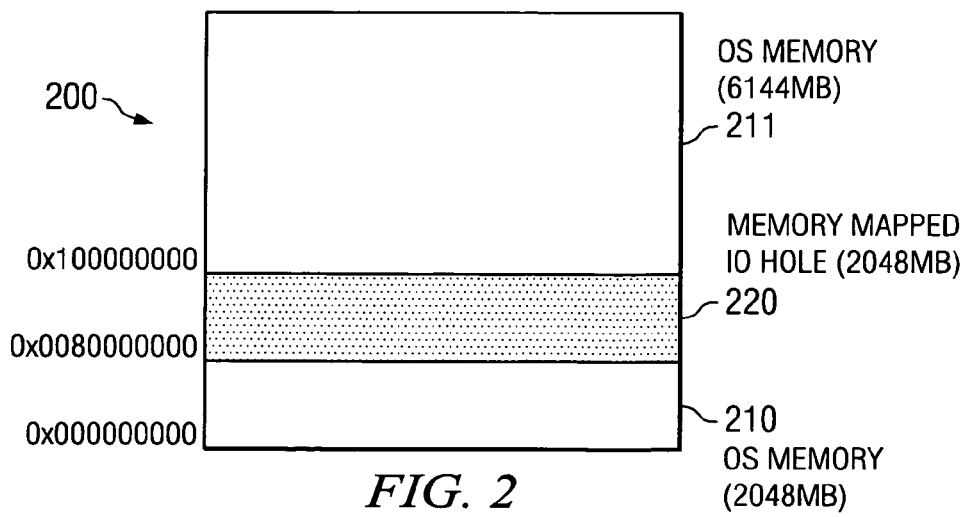
FIG. 2 is a diagrammatic illustration of a memory device having a non-contiguous physical memory address space that may be virtualized for support of memory addresses with a hole in accordance with a preferred embodiment of the present invention.

FIG. 2 is a diagrammatic illustration of a memory device, such as local memory 109 of data processing system 100 shown in FIG. 1, having a non-contiguous physical memory address space that may be virtualized for support of memory addresses with a hole in accordance with a preferred embodiment of the present invention. In the illustrative example, memory 200 provides 8 Gigabyte (GB), or 8192 MB, of system memory. The system memory is divided into two non-contiguous physical memory ranges. Particularly, memory 200 includes a first physical range 210 and a second physical range 211 separated by a memory mapped input/output (MMIO) physical range 220 that presents an address hole disposed intermediate physical ranges 210 and 211. In the illustrative example, physical range 210 comprises a 2048 megabyte (MB) range of system memory addressable by the operating system, and physical range 211 comprises a 6144 MB range of system memory addressable by the operating system. Physical range 210 comprises a physical address range from hexadecimal 0x000000000 to 0x07FFFFFFF, and physical range 211 comprises a physical address range from hexadecimal 0x100000000 to 0x15FFFFFFF. Cache inhibited addresses are mapped into physical range 220 having an address range intermediate physical ranges 210 and 211. Thus, memory 200 includes MMIO physical range 220 that presents a discontinuity in the physical addresses of the system memory provided by physical ranges 210 and 211. MMIO physical range 220 comprises 2048 MB of memory having a physical memory address range from hexadecimal 0x080000000 to 0xFFFFFFFF.

Figure 3:
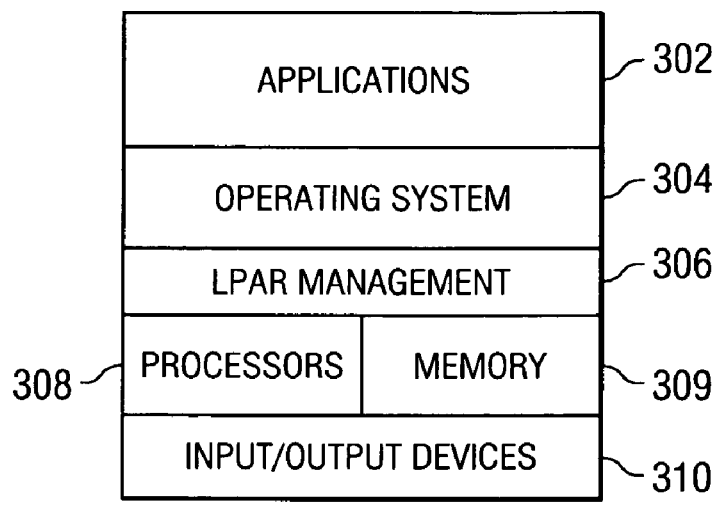
FIG. 3 is a diagrammatic illustration of a software and hardware configuration for implementing logical partition virtualization of a memory device for supporting memory addresses with a memory hole in accordance with a preferred embodiment of the present invention.

FIG. 3 is a diagrammatic illustration of a software and hardware configuration for implementing logical partition virtualization of a memory device for supporting memory addresses with a memory hole in accordance with a preferred embodiment of the present invention. Operating system 304 may be, for example, an implementation of the Linux operating system, another variant of the Unix operating system such as the Advanced Interactive executive operating system (AIX), or the like. Operating system 304 runs applications 302. Logical partitioning (LPAR) management 306 is a software system layer that facilitates the management of LPAR resources. LPAR management 306 may comprise computer executable instructions maintained, for example, as a computer program product stored on a hard disk or system firmware, such as firmware 115 of data processing system 100 shown in FIG. 1. LPAR management 306 may be implemented as, for example, the Hypervisor system, a product of International Business Machines Corporation in Armonk, N.Y. LPAR management 306 may additionally include computer executable logic allocated on a system memory device such as local memory 109 of data processing system 100 shown in FIG. 1. For example, LPAR management 306 may allocate a portion of physical ranges 210 or 211 for a logical-to-physical address mapping table, LPAR program and data storage, or the like. Additionally, LPAR 306 may allocate a page table for enabling operating system 304 virtual addressing support. Address space of physical ranges 210 or 211 consumed by the mapping table, page table, LPAR program and data storage is unavailable for access by the operating system.

LPAR management 306 manages O/S 304 access to system hardware such as processors 308 and memory 309 and input and output (I/O) devices 310. Processors 308 are representative of processors 102 and 104 of data processing system 100 and memory 309 is representative of local memory 109 of data processing system 100 shown in FIG. 1. Processors 308 support logical partitioning and are configured to run under a logical partitioning environment in accordance with a preferred implementation of the invention.

Figure 4:
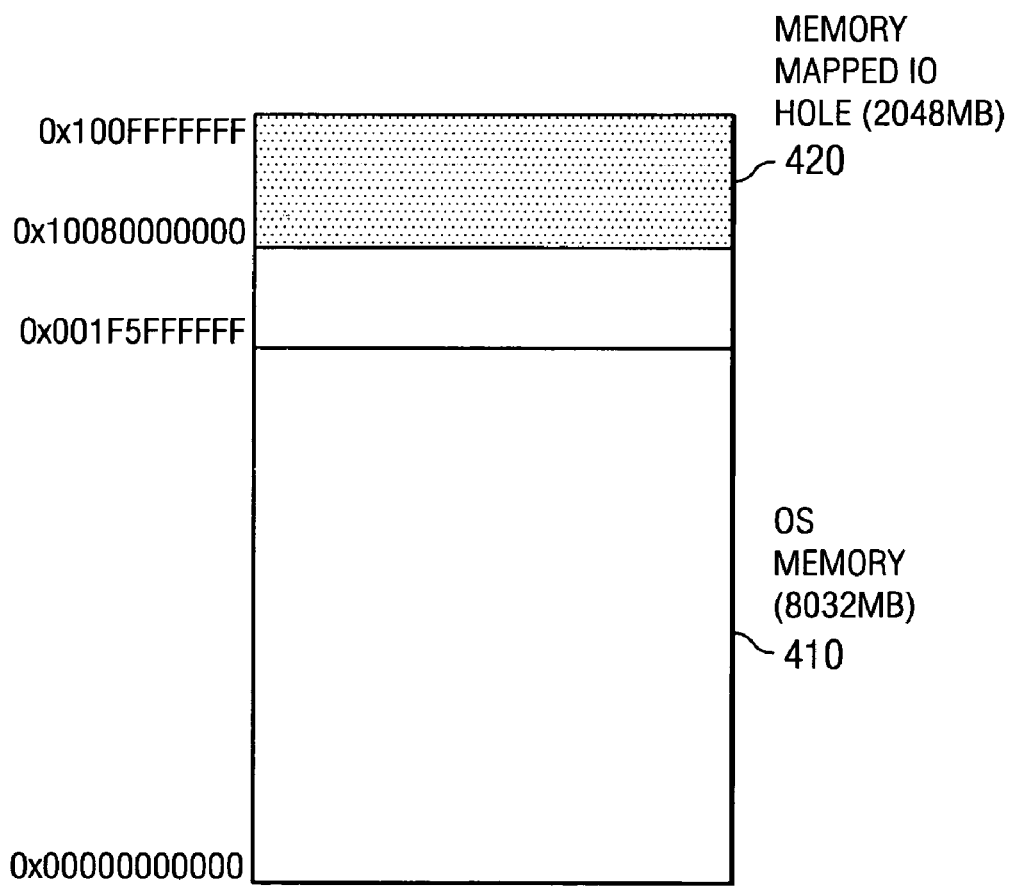
FIG. 4 is a diagrammatic illustration of a memory device that provides a contiguous logical system memory address space in accordance with a preferred embodiment of the present invention.

FIG. 4 is a diagrammatic illustration of a memory device, such as memory 309 shown in FIG. 3, that provides a contiguous logical address space to the operating system of data processing system 100 of FIG. 1 in accordance with a preferred embodiment of the present invention. The physical addresses of MMIO physical range 220 are virtualized into logical addresses above any logical address required for mapping system memory. In the illustrative example, MMIO physical range 220 having a physical address range of 0x080000000 to 0xFFFFFFFF is virtualized into logical MMIO range 420 having logical addresses from 0x10080000000 to 0x100FFFFFFF. Additionally, O/S 304 will be presented with system memory having logical addresses 0 to the size of the physical memory (less any overhead required for LPAR management 306).

In an exemplary implementation, system memory is accessed by logical range 410 having logical addresses from 0x00000000000 to 0x001F5FFFFFF is presented to O/S 304 and LPAR 306 program, data storage, and logical-to-physical mapping table consumes 32 MB of system memory. LPAR 306 utilizes 128 MB of system memory for a page table used by processors 308 for virtual address support. Thus, in the illustrative example, the system memory is addressed by logical range 410 that comprises logical addresses of 0x00000000000 to 0x001F5FFFFFF. MMIO physical range 220 is addressed by logical MMIO range 420 that comprises logical addresses from 0x10080000000 to 0x100FFFFFFF.

LPAR management 306 converts the logical addresses into corresponding physical addresses for access to the physical memory. For example, the conversion may be performed by a table-lookup for logical range 410 and a range check for logical MMIO range 420. Logical memory start and end addresses and corresponding physical memory start and end addresses that may be defined by a mapping table for memory address virtualization in accordance with a preferred embodiment of the present invention are summarized in Table A below. As shown by Table A, the lower most, or start, address of logical MMIO range 420 is greater than the upper most, or end, address of logical range 410.

TABLE A

| Logical Memory start-address | Logical memory end-address | Physical memory start-address | Physical memory end-address |
|---|---|---|---|
| 0x00000000000 | 0x00077FFFFFF | 0x008000000 | 0x07FFFFFFF |
| 0x00078000000 | 0x001EFFFFFFF | 0x100000000 | 0x277FFFFFF |
| 0x001F0000000 | 0x001F5FFFFFF | 0x002000000 | 0x007FFFFF |

| Logical MMIO start-address | Logical MMIO end-address | Physical MMIO start-address | Physical MMIO end-address |
|---|---|---|---|
| 0x10080000000 | 0x100FFFFFFF | 0x080000000 | 0x0FFFFFFFF |

Figure 5:
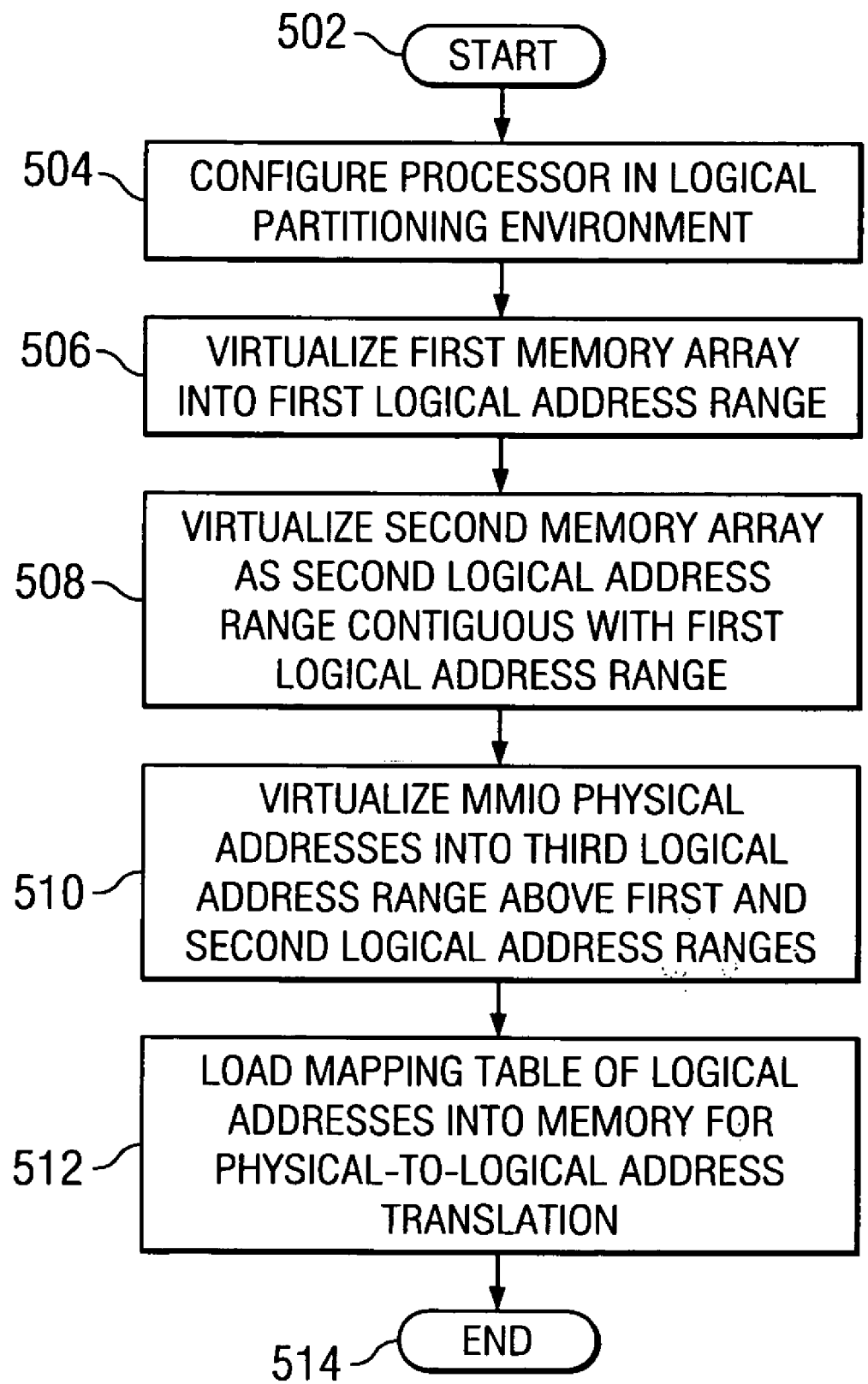
FIG. 5 is a flowchart of processing performed by a data processing system for configuring a memory device for operating system support of memory addresses with holes in accordance with a preferred embodiment of the present invention.

FIG. 5 is a flowchart of a routine performed by a data processing system, such as data processing system 100 of FIG. 1, for configuring a memory device for operating system support of memory addresses with holes in accordance with a preferred embodiment of the present invention. The routine begins (step 502), for example during a system boot, and the data processing system processor(s) is configured in a logical partitioning environment (step 504). A first physical memory array or range of physical memory addresses, such as physical range 210, is virtualized into a corresponding first logical address range or array (step 506). A second memory array, such as physical range 211, that is non-contiguous with the first memory array is then virtualized (step 508). Virtualization of the second physical range is performed such that the virtual address range corresponding to the second memory array is contiguous with the logical address range produced from virtualization of the first memory array. Thus, the logical address ranges produced from virtualization of the first and second physical ranges result in a contiguous logical address range.

The MMIO physical address range is then virtualized into a third logical address range (step 510). The virtualization of the MMIO physical address range is performed such that the lower most logical address of the logical address range produced from virtualization of the MMIO physical address range is greater than the upper most logical address of the logical address ranges produced from virtualization of physical ranges 210 and 211. The mapping table is then loaded into the system memory device for providing logical-to-physical address translation (step 512) and the routine then exits (step 514). Accordingly, the operating system is advantageously presented with a single, contiguous logical address space for access to system memory such as logical range 410 shown in FIG. 4.

Thus, the present invention provides a data processing system that supports system memory addresses with holes. Non-contiguous physical address ranges of system memory are virtualized into a contiguous logical address space. A memory mapped input/output physical range is virtualized into a logical range of memory having a lower most address that is above the upper most address of the logical range of the system memory. Advantageously, no modification of the data processing system O/S kernel is required for supporting system memory addresses with holes.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, or DVD-ROMs. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of supporting memory addresses with holes, the method comprising the computer implemented steps of:

virtualizing a first physical address range allocated for system memory for an operating system run by a processor configured to support logical partitioning to produce a first logical address range;

virtualizing a second physical address range allocated for system memory for the operating system to produce a second logical address range, wherein the first physical address range and the second physical address range are non-contiguous and the first logical address range and the second logical address range are contiguous;

virtualizing a memory mapped input/output physical address range that is intermediate the first physical address range and the second physical address range to produce a third logical address range, wherein a lowermost logical address of the third logical address range exceeds a respective uppermost logical address of the first and second logical address ranges;

wherein the steps of virtualizing the first physical address range, the second physical address range, and the memory mapped input/output physical address range comprise maintaining a mapping table that defines physical addresses and corresponding logical addresses; and wherein maintaining the mapping table further comprises maintaining the mapping table in a physical address space allocated to one of the first and second physical address ranges, and wherein the physical address space is unavailable to the operating system accessing the first and second physical address ranges.

2. The method of claim 1, wherein the third logical address range is non-contiguous with the first logical address range and the second logical address range.

3. The method of claim 1, further comprising:

allocating a portion of at least one of the first physical address range and the second physical address range for a logical partitioning management software layer.

4. The method of claim 1, wherein the memory mapped input/output physical address range is allocated for cache inhibited addresses.

5. A computer program product that is stored in a computer readable recordable-type medium for virtualizing non-contiguous physical memory ranges into a contiguous logical address range, the computer program product comprising:

instructions for virtualizing a first range of contiguous physical addresses, which are allocated for system memory for an operating system run by a processor configured to support logical partitioning, to produce a first range of contiguous logical addresses;

instructions for virtualizing a second range of contiguous physical addresses, which are allocated for system memory for the operating system, to produce a second range of contiguous logical addresses, the first range of contiguous physical addresses and the second range of contiguous physical addresses being non-contiguous, the first range of contiguous logical addresses and the second range of contiguous logical addresses being contiguous and forming a combined range of contiguous logical addresses;

instructions for virtualizing a third range of contiguous physical addresses, which is allocated for memory mapped input/output, that is intermediate to the first range of contiguous physical addresses and the second range of contiguous physical addresses to produce a third range of contiguous logical addresses, a lowermost logical address of the third range of contiguous logical addresses exceeding an uppermost logical address of the combined range of contiguous logical addresses;

instructions for maintaining a mapping table that defines physical addresses and their corresponding logical addresses; and wherein the mapping table is maintained in at least one of the first range of contiguous physical addresses and the second range of contiguous physical addresses.

6. The computer program product of claim 5, further comprising instructions for converting a logical physical address into a corresponding physical address.

7. The computer program product of claim 5, further comprising:

instructions for converting a logical physical address into a corresponding physical address; and the instructions for converting a logical physical address into a corresponding physical address being maintained in at least one of the first range of contiguous physical addresses and the second range of contiguous physical addresses.

8. The computer program product of claim 5, wherein the third range of contiguous logical addresses and the combined range of contiguous logical addresses are non-contiguous.

9. The computer program product of claim 8, further comprising:

instructions for allocating a portion of at least one of the first range of contiguous physical addresses and the second range of contiguous physical addresses for a logical partitioning management software layer.

10. The computer program product of claim 5, wherein the third range of contiguous physical addresses is allocated for cache inhibited memory mapped input/output addresses.

11. A data processing system for supporting non-contiguous system memory ranges, comprising:

a memory that contains a first range of contiguous physical addresses allocated for system memory, a second range of contiguous physical addresses allocated for system memory, and a third range of contiguous physical addresses allocated for memory-mapped input/output, the third range of contiguous physical addresses intermediate to the first range of contiguous physical addresses and the second range of contiguous physical memory addresses;

the first range of contiguous physical addresses and the second range of contiguous physical addresses being non-contiguous;

a processor for virtualizing the first range of contiguous physical addresses to produce a first range of contiguous logical addresses;

the processor for virtualizing the second range of contiguous physical addresses to produce a second range of contiguous logical addresses;

the first range of contiguous logical addresses and the second range of contiguous logical addresses being contiguous and forming a combined range of contiguous logical addresses;

the processor for virtualizing the third range of contiguous physical addresses to produce a third range of contiguous logical addresses, a lowermost logical address of the third range of contiguous logical addresses exceeding an uppermost logical address of the combined range of contiguous logical addresses;

a set of instructions that is executed by the processor for virtualizing the first, second, and third ranges of contiguous physical addresses, wherein the set of instructions is maintained in the memory in at least one of the first and second ranges of contiguous physical addresses.

12. The data processing system of claim 11, further comprising a data set, wherein the data set is a mapping table defining logical-to-physical memory address translations.

13. The data processing system of claim 11, further comprising a set of instructions that is executed by the processor, wherein the set of instructions provides logical partitioning management.

14. The data processing system of claim 11, further comprising a mapping table that defines logical-to-physical memory address translations, the mapping table maintained in the memory in at least one of the first and second ranges of contiguous physical addresses.

15. The data processing system of claim 11, further comprising:

the combined range of contiguous logical addresses being non-contiguous with the third range of contiguous logical addresses.

* * * * *